United States Patent [19]
Gottstein et al.

[11] Patent Number: 5,195,629
[45] Date of Patent: Mar. 23, 1993

[54] DEVICE FOR TRANSFERRING PLATFORMS MOVABLE ON ROLLERS FROM A CONVEYOR TO A CROSS-CONVEYOR

[75] Inventors: Norbert Gottstein, Weinheim; Klaus Schäfer, Darmstadt, both of Fed. Rep. of Germany

[73] Assignee: Mannesmann Aktiengesellschaft, Dusseldorf, Fed. Rep. of Germany

[21] Appl. No.: 806,729

[22] Filed: Dec. 12, 1991

[30] Foreign Application Priority Data
Dec. 17, 1990 [DE] Fed. Rep. of Germany ....... 4040795

[51] Int. Cl.$^5$ ............................................. B65G 47/84
[52] U.S. Cl. ............................. 198/465.2; 198/465.3; 198/782
[58] Field of Search ............ 198/371, 372, 465.1, 198/465.2, 465.3, 782

[56] References Cited

U.S. PATENT DOCUMENTS

| | | | |
|---|---|---|---|
| 3,565,233 | 2/1971 | Hinman | 198/782 |
| 3,710,917 | 1/1973 | Black et al. | 198/372 |
| 4,359,000 | 11/1982 | Tokunaga | 198/465.2 X |
| 4,437,560 | 3/1984 | Wolf | 198/372 X |
| 4,762,218 | 8/1988 | Sticht | 198/465.2 X |
| 4,850,471 | 7/1989 | Annas, Sr. et al. | 198/372 X |
| 4,981,203 | 1/1991 | Kornylak | 198/782 X |
| 5,012,917 | 5/1991 | Gilbert et al. | 198/465.2 |

FOREIGN PATENT DOCUMENTS

| | | | |
|---|---|---|---|
| 3241100 | 6/1984 | Fed. Rep. of Germany | 198/372 |
| 2118127 | 10/1983 | United Kingdom | 198/465.2 |

Primary Examiner—Robert P. Olszewski
Assistant Examiner—James R. Bidwell
Attorney, Agent, or Firm—Cohen, Pontani, Lieberman, Pavane

[57] ABSTRACT

A device for transferring platforms movable on rollers from one conveyor onto another cross-over conveyor, the platforms being driven along the conveyors by motor driven friction wheels positioned along the conveyor so as to contact the outer surfaces of the platform. A pair of friction wheels are mounted on a rotatable swing lever of a rotatable friction wheel assembly so that the frictional wheels engage and drive the platform from one conveyor to the other.

19 Claims, 2 Drawing Sheets

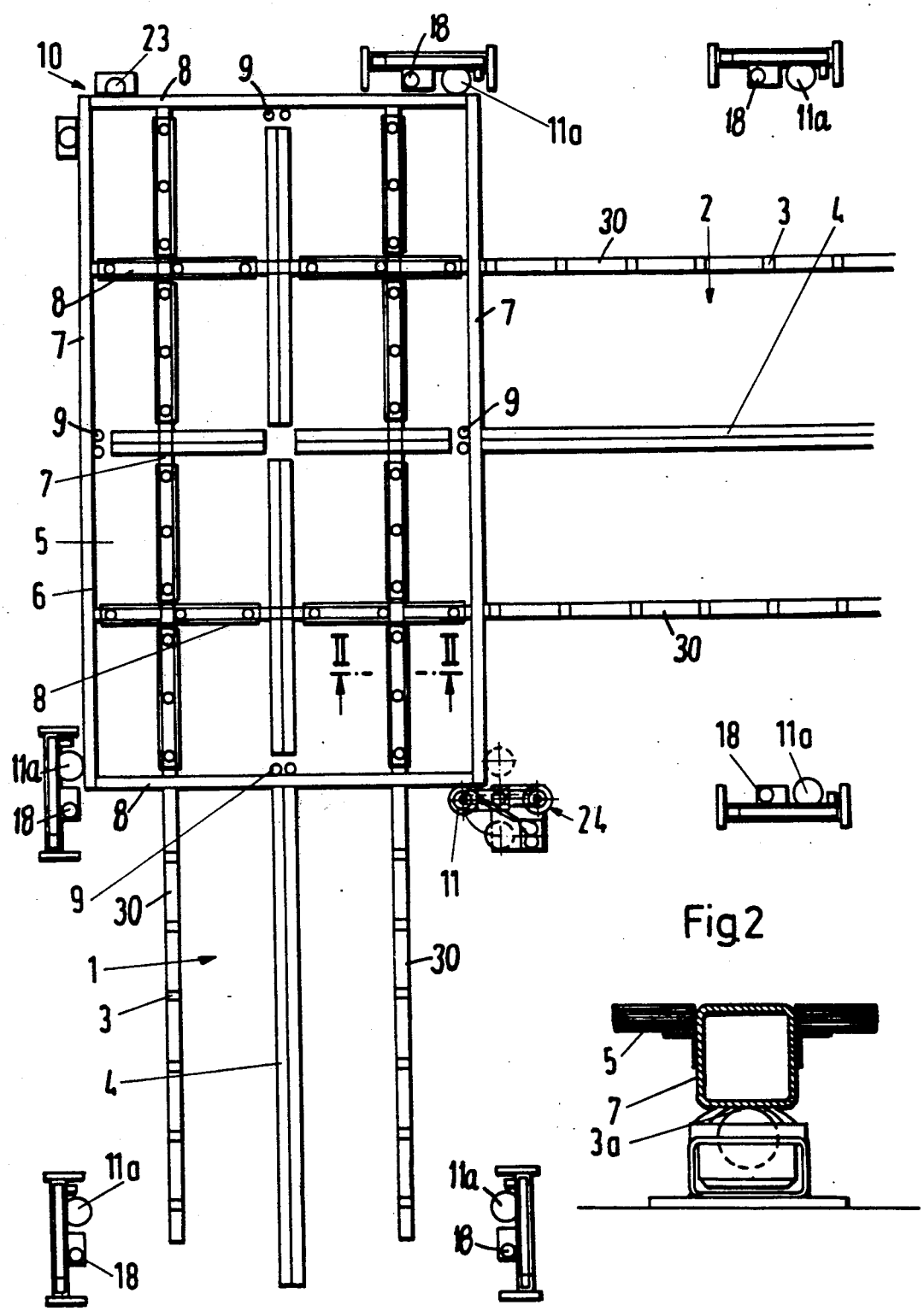

DEVICE FOR TRANSFERRING PLATFORMS MOVABLE ON ROLLERS FROM A CONVEYOR TO A CROSS-CONVEYOR

FIELD OF THE INVENTION

The present invention relates to a device for transferring roller mounted platforms from one conveyor to another, cross-conveyor.

BACKGROUND OF THE INVENTION

The use of platforms that roll along a conveyor or in production line for assembly manufacture is disclosed in Federal Republic of Germany Patent Document OS 38 40 256, in which passenger cars are transported during their assembly. At the ends of the production line, transfer stations are necessary so that the platforms, also known as skids, can be transported back to the starting point of the production line over a parallel path. Transfer stations can also be used to transfer a platform to another conveyor that is part of a different section of the assembly line.

Typically, the platform or skid is propelled or displaced along the conveyors using driven friction wheels which are positioned along the conveyor and engage the sides of the platform, thereby driving it along the conveyor. The use of such driven friction wheels permits the platform to have a relatively low structural height. Driven friction wheels can also be used at transfer stations where the direction of travel of the platform is changed; however, because the friction wheels must contact a side surface of the platform, the friction wheels usually interfere with the movement of the platform when its path of travel is changed at a transfer station. As a result, it is typically necessary to lift the platform to avoid the friction wheels and, thereafter, to lower the platform once the platform has passed over the friction wheels.

SUMMARY OF THE INVENTION

An object of the present invention, therefore is to provide a means for allowing a platform to be transferred from a conveyor to a cross-conveyor using friction wheels but without requiring the platform to be lifted and lowered at the transfer station.

The friction wheel apparatus of the present invention includes two friction wheels that are mounted on either end of a swing lever which is rotatably supported at its center by a vertical swing shaft. At a transfer station where a platform is to change its direction of travel by, for example, 90°, the rotatable friction wheel assembly of the present invention is positioned so that one of its two friction wheels engages the corner of the platform at the inner side of the right angle curve as the platform enters the transfer station along a first conveyor. When the platform is to change its direction of travel by 90° to a cross-conveyor, the rotatable friction wheel assembly of the present invention rotates 90° so that the other friction wheel engages the corner of the platform, thereby driving the platform in its new direction of travel along the cross-conveyor. Because the rotatable friction wheel assembly is positioned at the inside corner of the intersection of the two conveyors, the rotatable friction wheel assembly only has to swing 90° instead of having to rotate 270° if the assembly were positioned at the outside corner of the intersection of the two conveyors. Conventional friction wheels are fixed in position along the edges of the two conveyors so that these friction wheels engage the side of the platform directly opposite to that which engages the rotatable friction wheel assembly.

In another embodiment of the present invention, a single drive motor operates both of the friction wheels of the rotatable friction wheel assembly using toothed belts or chains that drive gear wheels mounted to the two friction wheels. The motor is positioned so that its transmission shaft is coaxial with the axis of rotation of the rotatable friction wheel assembly. Thus, only one drive motor is necessary to drive both frictional wheels on the rotatable drive friction wheel assembly. In yet a further embodiment of the present invention, a single swing motor is used to rotate the friction wheel station. The swing motor rotates a crank about an angle of about 190°. The crank is mechanically connected by a connecting rod to the swing lever of the rotatable friction wheel assembly. In both positions of the rotatable friction wheel assembly, the lines of action of the crank and connecting rod form a straight line, i.e., the line of action of the lever coincides with that of the crank. With this transmission arrangement, the maximal amount of force can be applied by the friction wheels against the frame of the platform, and this maximal force can be applied when the rotatable friction wheel assembly is at either at its two positions. Furthermore, springs are used in mounting the friction wheels to the rotatable friction wheel assembly to urge the friction wheels against the frame of the platform.

To prevent the platform from sliding laterally or tipping as a result of the force applied to the platform by the friction wheels, guide rollers, which are mounted to the platform so that they rotate about a vertical axis, roll along vertical surfaces of stationary guide rails in the conveyors to guide the platform along its path of travel. By using the guide rollers that engage and roll along the guide rails, no guide is required adjacent to the rollers which support the weight of the platform.

The supporting rollers are rotatably fastened to the floor and have upwardly directed exposed travel surfaces which contact the underside of the platform frame. In the region of the transfer station, the supporting rollers have spherical heads or are universal rollers which rotate in more than one direction. The rollers in the region of the transfer station are positioned in a staggered fashion so that they support the platform when it travels along one conveyor but do not impede the movement of the platform when it travels along the other conveyor.

Other objects and features of the present invention will become apparent from the following detailed description considered in conjunction with the accompanying drawings. It is to be understood, however, that the drawings are designed solely for purposes of illustration and not as a definition of the limits of the invention, for which references should be made to the appended claims.

BRIEF DESCRIPTION OF THE DRAWINGS

FIG. 1 is a top view of a transfer station of a conveyor system in accordance with the present invention;

FIG. 2 is a cross-sectional view of a support roller of the transfer station shown in FIG. 1 taken along lines II—II;

DETAILED DESCRIPTION OF THE PRESENTLY PREFERRED EMBODIMENTS

Figure 4:
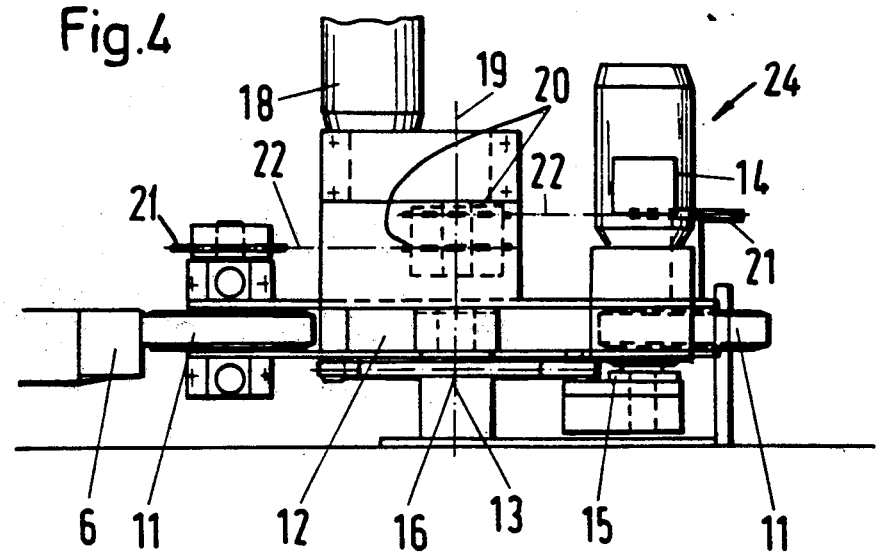
FIG. 4 is a side view of the rotatable friction wheel station shown in FIG. 3 taken along the lines IV—IV.

FIG. 1 depicts a preferred embodiment of the conveyor transfer station of the present invention. Conveyor 1 meets conveyor 2 at transfer station 10. Although conveyor 1 is shown as being perpendicular or 90° to conveyor 2, the conveyors may intersect at a variety of angles. Conveyors 1 and 2 are each comprised of two parallel roller paths 30 and a central guide rail 4. Rollers 3 mounted along the roller paths 30 have upwardly directed travel surfaces that support longitudinal girders 7 and transverse girders 8 of platform 5 as platform 5 travels along conveyors 1 and 2. Four pairs of guide rollers 9 are rotatably mounted to platform 5 so that they engage the vertical edges of guide rails 4 to guide platform 5 along conveyors 1 and 2 and to prevent platform 5 from slipping laterally or from tipping. Outer frame 6 of platform 5 is comprised of two longitudinal girders 7 and two transverse girders 8. Friction wheels 11 and 11a are fixedly mounted along conveyors 1 and 2 so that their friction wheels engage the outer frame 6 of platform 5 and thereby drive platform 5 along conveyors 1 and 2. The friction wheels are each driven by drive motors 18.

In the region of conveyors 1 and 2 near transfer station 10, rollers 3 are replaced by rollers that have spherical heads 3a, as shown in FIG. 2. As shown in FIG. 1, spherical heads 3a are positioned at the transfer station 10 so that they support longitudinal girders 7 of platform 5 when platform 5 is travelling along conveyor 1 and transverse girders 8 of platform 5 when platform 5 is travelling along conveyor 2.

Figures 5, 6:
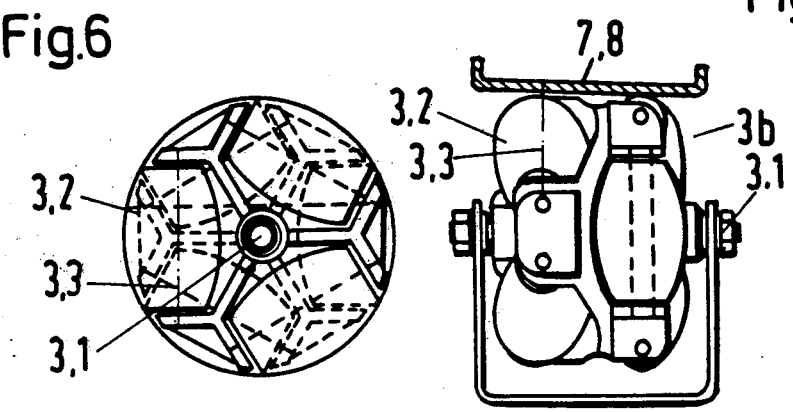
FIG. 5 is a side perspective view of an another embodiment of the support roller shown in FIG. 2.
FIG. 6 is a side view of the support roller shown in FIG. 5.

In another embodiment of the present invention, the platform 5 can also be supported from below by universal rollers 3b as shown in FIGS. 5 and 6. Universal rollers 3b are preferably comprised of six partial rollers that rotate about six different axes oriented about the circumference of universal roller 3b. Universal rollers 3b may, however, be comprised of more or less than six partial rollers. When platform 5 is travelling along the conveyors in a direction perpendicular to the axis 3.1, the entire universal roller 3b rotates about axis 3.1. However, when platform 5 is transferred from one conveyor to another conveyor travelling in a different direction, such as, for example, parallel to axis 3.1, one of the six partial rollers 3.2 of universal roller 3b rotates about its axis, for example, 3.3. Although using universal rollers 3b is more expensive than using spherical head rollers 3a, universal rollers 3b roll with less friction thereby subjecting longitudinal girders 7 and cross-girders 8 to a lighter frictional load.

Fixed stops 23 are positioned at the outer corner of transfer station 10. At the corner of transfer station 10 diagonally opposite that adjacent to fixed stops 23, i.e., the internal corner of transfer station 10, a rotatable friction wheel assembly 24 is positioned. Conventional, non-rotatable friction wheels 11a are fixed at positions along the edges of the two conveyors at the transfer station so that the friction wheels 11a engage the side of the platform directly opposite to that which engages the rotatable friction wheel assembly 24, i.e., at the upper right and lower left of the platform 5, as shown in FIG. 1.

Figure 3:
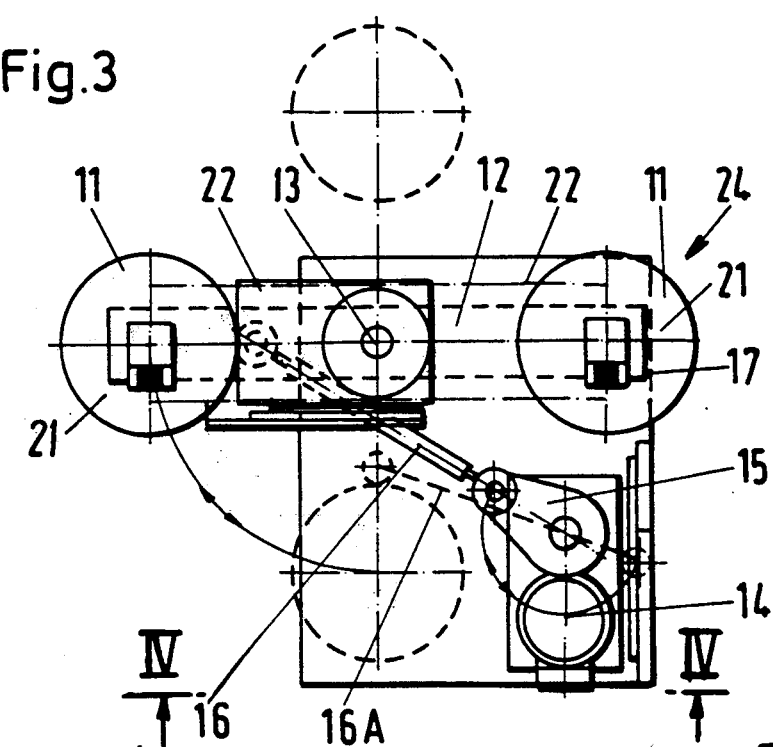
FIG. 3 is a detailed top view of the rotatable friction wheel assembly shown in FIG. 1.

As shown in more detail in FIGS. 3 and 4, friction wheel assembly 24 includes two friction wheels 11 which are rotatably mounted to the ends of a swing lever 12 which is rotatably supported at its center by a vertical swing shaft 13. Swing lever 12 is rotated by connecting rod 16 which is mechanically connected to crank 15 which is rotated by swing motor 14. Connecting rod 16 is rotatably connected proximate to an end of swing lever 12. By rotating crank 15, connecting rod 16 causes swing lever 12 to rotate about its axis, thereby shifting friction wheels 11 from, for example, the position shown in FIG. 3 in broken lines in which friction wheels 11 rest against longitudinal girders 7 of outer frame 6 of platform 5 as it travels along conveyor 1, to the position shown in solid lines where friction wheels 11 rest against cross-girders 8 of outer frame 6 of platform 5 as it travels along conveyor 2. When swing lever 12 rotates about vertical swing axis 13 by about 90°, crank 15 rotates between two end points that are separated by an angle of about 190°, as shown in FIG. 3. When the frictional wheel assembly 24 is in the position where friction wheels 11 engage longitudinal girder 7, as shown in broken lines in FIGS. 1 and 3, the line of action of crank 15 coincides with that of connecting rod 15, i.e., along line 16A. Similarly, when the frictional wheel assembly 24 is in the position where frictional wheels 11 engage transverse girder 8, as shown in solid lines in FIGS. 1 and 3, the line of action of crank 15 also coincides with that of connecting rod 15. As a result of this transmission orientation, the force that the friction wheels 11 apply to the girders 7 and 8 of platform 5 is always maximized.

Because the rotatable friction wheel assembly 24 is positioned at the inside corner of the intersection of the two conveyors 1 and 2, i.e., at the bottom right of platform 5 as shown in FIG. 1, the rotatable friction wheel assembly 24 needs to swing only 90° in order shift its contact from longitudinal girder 7 to transverse girder 8, or vice versa. However, if the friction wheel assembly 24 were, instead, positioned at the outside corner of the intersection of conveyers 1 and 2, i.e., at the upper left of platform 5 as shown in FIG. 1, the rotatable friction wheel assembly 24 would have to rotate by about 270°. Thus, by positioning the rotatable friction wheel assembly 24 at the inner corner of the intersection of the two conveyors, the angle of rotation of the friction wheel assembly 24 is minimized.

Drive motor 18 is mounted onto swing shaft 13 so that the transmission shaft 19 of drive motor 18 is vertically above and parallel to swing shaft 13. Two gear wheels 20 are fixedly mounted to transmission shaft 19 and engage two toothed belts 22, which, in turn, each drive a gear wheel 21 fixedly mounted to the shafts of the friction wheels 11. Friction wheels 11 are mounted on swing lever 12 so that they can be displaced to contact girders 7 and 8 of platform 5 by the pressure of springs 17 which are preferably cup springs. Drive motor 18 and swing motor 14 are preferably electrically connected to a remote controller (not shown) that controls and monitored the operation of the motors remotely. Such a remote controller may comprise, for example, an appropriate manual control panel or a computer programmed controller.

Thus, while there has been shown and described and pointed out fundamental novel features of the invention as applied to a preferred embodiment thereof, it will be understood that various omissions, substitutions and changes in the form and details of the disclosed apparatus, and in its operation, may be made by those skilled in the art without departing from the spirit of the invention. It is the intention, therefore, to be limited only as indicated by the scope of the claims appended hereto.

What is claimed is:

1. A transfer station operable on a platform conveyor system for transferring a platform (5), displaceable on rollers (3), from a first conveyor (1) to a second, intersecting conveyor (2) in which said platform conveyor system moves the platform (5) along said conveyors (1, 2) by a plurality of driven, vertically rotatable friction wheels positioned alongside said conveyors (1, 2), said rollers (3) being rotatably mounted in said conveyors (1, 2) and spaced along said conveyors (1, 2) so as to contact said platform (5) when said platform (5) is adjacent each of said rollers (3), comprising:
   a rotatable friction wheel assembly (24) positioned in an intersection point where said first conveyor (1) intersects said second conveyor (2) comprising:
      a frame;
      a swing lever (12) mounted to said frame so that said swing lever (12) is rotatable about a vertical swing axis (13), said swing axis (13) positioned adjacent to said conveyors (1, 2); and
      at least one friction wheel (11) rotatably mounted to said swing lever (12) so that said friction wheel (11) is capable of making contact with said platform (5) to drive said platform (5) along either of said conveyors (1, 2).

2. The transfer station of claim 1, comprising two friction wheels (11), a first of said friction wheels (11) being mounted at a first end of said swing lever (12), and a second of said friction wheels (11) being mounted at a second end of said swing lever (12), wherein said vertical swing axis (13) is positioned at a point equidistant between said two ends of said swing lever (12).

3. The transfer station of claim 2, wherein said swing lever (12) rotates about an arc of at least about 90°.

4. The transfer station of claim 2, further comprising at least two fixed friction wheels (11a) positioned adjacent said conveyors (1, 2) and along sides of said conveyors (1, 2) directly opposite to said rotatable friction wheel assembly (24).

5. The transfer station of claim 1, wherein said friction wheels (11) contact an outer frame (6) of said platform (5), said outer frame (6) surrounding a portion of said platform (5) adjacent said conveyors (1, 2).

6. The transfer station of claim 4, wherein said friction wheels (11) contact an outer frame (6) of said platform (5), said outer frame (6) surrounding a portion of said platform (5) adjacent said conveyors (1, 2).

7. The transfer station of claim 2, further comprising:
   gear wheels (21) fixedly attached to each of said two friction wheels (11);
   a drive motor (18) mounted to said swing lever (12) and having a transmission shaft (19) oriented coaxial with said vertical swing axis (13); and
   a means for drivingly connecting said gear wheels (21) to said transmission shaft (19).

8. The transfer station of claim 1, further comprising:
   a connecting rod (16) rotatably connected proximate to an end of said swing lever (12);
   a crank (15) rotatably connected to said connecting rod (16); and
   a swing motor (14) mounted to said frame and drivingly connected to said crank (15) operable to cause said swing lever (12) to rotate about said vertical swing axis (13).

9. The transfer station of claim 8, wherein said crank (15) is rotatable by said swing motor (14) between two end points separated by an angle of about 190°, said end points being positioned so that the line of action of said crank (15) and said connecting rod (16) form a line when said crank (15) is at either of said end points.

10. The transfer station of claim 2, further comprising resilient means that urge said friction wheels (11) to contact said platform (5).

11. The transfer station of claim 1, wherein said rollers (3) rotatably mounted in said conveyors (1, 2) and upon which said platform (5) moves have upwardly directed travel surfaces.

12. The transfer station of claim 11, wherein said rollers (3) positioned adjacent to said transfer station have spherical heads (3a).

13. The transfer station of claim 12, wherein the rollers having spherical heads (3a) are in staggered positions so that said rollers having spherical heads support said platform (5) when said platform (5) moves along one conveyor and do not impede the movement of said platform (5) when said platform (5) moves along the other conveyor.

14. The transfer station of claim 11, wherein said rollers (3) positioned adjacent to said transfer station are universal rollers.

15. The transfer station of claim 1, further comprising guide rollers (9) vertically and rotatably mounted to said platform (5), said guide rollers (9) cooperating with guide rails (4) fixedly mounted to said conveyors (1, 2) to guide said platform (5) along said conveyors (1, 2).

16. A transfer station operable on a platform conveyor system for transferring a platform, displaceable on rollers, from a first conveyor to a second, intersecting conveyor in which said platform conveyor system moves the platform along said conveyors by a plurality of driven, vertically rotatable friction wheels positioned alongside said conveyors, said rollers being rotatably mounted in said conveyors and spaced along said conveyors to as to contact said platform when said platform is adjacent each of said rollers, comprising:
   a rotatable friction wheel assembly positioned in an intersection point where said first conveyor intersects said second conveyor comprising:
      a frame;
      a swing lever mounted to said frame so that said swing lever is rotatable about a vertical swing axis, said swing axis positioned adjacent to said conveyors; and
      two friction wheels rotatably mounted to said swing lever, a first of said friction wheels being mounted at a first end of said swing lever, and a second of said friction wheels being mounted at a second end of said swing lever, so that said first friction wheel is capable of making contact with said platform to drive said platform along said first conveyor, and said second friction wheel is capable of making contact with said platform to drive said platform along said second conveyor.

17. The transfer station of claim 16, wherein said vertical swing axis is positioned at a point equidistant between said two ends of said swing lever.

18. The transfer station of claim 16, wherein said swing lever rotates about an arc of 90°.

19. The transfer station of claim 17, further comprising at least two fixed friction wheels positioned adjacent said conveyors and along sides of said conveyors directly opposite to said rotatable friction wheel assembly.

* * * * *